United States Patent [19]
Bessacini

[11] Patent Number: 6,006,145
[45] Date of Patent: Dec. 21, 1999

[54] METHOD AND APPARATUS FOR DIRECTING A PURSUING VEHICLE TO A TARGET WITH INTELLIGENT EVASION CAPABILITIES

[75] Inventor: Anthony F. Bessacini, Narragansett, R.I.

[73] Assignee: The United States of America as represented by the Secretary of the Navy, Washington, D.C.

[21] Appl. No.: 08/885,701

[22] Filed: Jun. 30, 1997

[51] Int. Cl.⁶ .................................................. G06F 165/00
[52] U.S. Cl. .................................. 701/1; 701/23; 701/24; 701/27; 701/302; 244/3.1; 244/3.11; 244/3.14; 244/3.15; 244/3.16; 244/3.19
[58] Field of Search .................................. 701/1, 23, 24, 701/27, 302; 244/3.11, 3.1, 3.14, 3.15, 3.16, 3.19

[56] References Cited

U.S. PATENT DOCUMENTS 3,783,441  1/1974  Slawsky ........................................ 340/2
4,079,687  3/1978  Mentcher ............................... 114/20 R
5,208,784  5/1993  Launkien ..................................... 367/1
5,721,680  2/1998  Van Cleve et al. ......................... 701/1
5,828,571  10/1998  Bessacini et al. .......................... 701/1

Primary Examiner—William A. Cuchlinski, Jr.
Assistant Examiner—Olga Hernandez
Attorney, Agent, or Firm—Michael J. McGowan; Prithvi C. Lall; Michael F. Oglo

[57] ABSTRACT

A method and apparatus for directing a pursuing vehicle, such as a torpedo, on an intercept trajectory from a launching vehicle to a target vehicle with evasion capabilities. Models of the pursuing vehicle and evading target provide proposed trajectories based upon various environmental considerations. A guidance system uses estimates of initial operating parameter solutions, such as gyro angle, alertment time and intercept time, to begin a convergent, iterative process that defines final operating parameter solutions from which the guidance parameters are determined and transferred to the pursuing vehicle at launch. During each iteration, the solution determines an alertment time and an alertment bearing from the target vehicle to the pursuing vehicle at the alertment time. A selected evasive strategy includes a turn that is calculated relative to the alertment bearing.

15 Claims, 7 Drawing Sheets

METHOD AND APPARATUS FOR DIRECTING A PURSUING VEHICLE TO A TARGET WITH INTELLIGENT EVASION CAPABILITIES

CROSS REFERENCE TO RELATED APPLICATION

U.S. patent application Ser. No. 08/521,207 filed Aug. 30, 1995 now U.S. Pat. No. 5,828,571 by Bessacini et al. for a Method and Apparatus for Directing a Pursuing Vehicle to a Target with Evasion Capabilities assigned to the same assignee as the present invention.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to trajectory control and more specifically to a method and apparatus for providing guidance parameters at launch that direct a pursuing vehicle from a launching vehicle to a target vehicle capable of evasive maneuvering after the target vehicle becomes alerted to the presence of the pursuing vehicle.

(2) Description of the Prior Art

The trajectory control of a pursuing vehicle can be classified as post-launch or pre-launch control. In post-launch control, guidance information is sent from the launching vehicle to guide the pursuing vehicle to the target vehicle. The following U.S. Letters Patent disclose such post-launch trajectory control systems:

| | |
|---|---|
| 3,260,478 | (1966) Welti |
| 3,643,616 | (1972) Jones |
| 3,784,800 | (1974) Willoteaux |
| 5,319,556 | (1994) Bessacini |

The Welti patent discloses the control of a first object in dependence upon a position of a second object for collision or anti-collision purposes. A regulator, that controls the travel and includes a travel control member for the first object, receives positional information of the first and second objects as a pilot magnitude and a reference magnitude. One of the positional informations is delayed in dependence upon a timing interval proportional to the time change of the quotient of the distance information of the two objects. The regulator subsequently supplies an output magnitude to the travel control member that represents the time differentials between the angular co-ordinates of the first and second objects modified by a disturbance magnitude.

The Jones patent discloses a method and apparatus for guiding a torpedo along a collision course to a moving target ship. A control system on the launching vehicle sends guidance parameters over a communication cable to maintain a predetermined, substantially constant lead angle with respect to the target ship by adjusting torpedo speed as the torpedo travels toward an anticipated collision.

In the Willoteaux patent a trajectory control system calculates the distance between a moving body and other moving or stationary objects by taking account of the speeds and direction of each. The control system simulates a series of hypothetical trajectories diverging on either side of the actual trajectory until a hypothetical trajectory is determined which satisfies various imperatives. The system then instructs the moving body control system to change the linear and or angular speed thereof so that the moving body follows the latter trajectory.

The Bessacini patent discloses an adaptive trajectory apparatus and method for providing, after launch, vehicle control commands to steer an underwater vehicle launch from a vessel toward a contact. As commands produced by this system transfer by between the launching vessel and the launched vehicle over a communications link.

As generally found in prior art post-launch control systems, a pursuing vehicle exits a launching vehicle. Control systems on the launching vehicle monitor the relative positions of the pursuing vehicle and a target vehicle or contact and control the pursuing vehicle by the transfer of information between the launching vehicle and the pursuing vehicle over a communications link. When the launching vehicle is a submarine and the pursuing vehicle is a torpedo, the communications link typically comprises a communications wire. If the pursuing vehicle is a missile the communications typically occurs over some radio link. In either case, post-launch control systems on the launching vehicle issue guidance parameters to guide the pursuing vehicle along some trajectory into a predetermined relationship with the target vehicle.

In a pre-launch system, the pursuing vehicle follows a predetermined trajectory after launch that may or may not be programmable prior to launch. However, with either type, the pursuing vehicle leaves the launching vehicle and travels along a trajectory that may be simple or complicated. With torpedoes, missiles and the like that may undergo pre-programmed maneuvers, the input guidance parameters may include gyro angles and time lapses, including, for example, the time lapse between the launch and the enablement of any instrumentation on the pursuing vehicle, such as an acoustic seeker on a torpedo.

In order to provide the most accurate pre-launch guidance parameters to the pursuing vehicle, it is necessary that the interval between the time a last estimate of target vehicle state is made and the time a pursuing vehicle is launched be quite short. It is during this interval that a prior art pre-launch system must produce the guidance parameters, and this interval has constrained the nature of the analysis required to produce such guidance parameters. For example, prior art pre-launch systems generally assume that the target will maintain a constant velocity even after the target becomes alerted to the presence of the pursuing vehicle. In actual practice, however, a target normally takes evasive action by turning, changing speed or both. Some prior art pre-launch systems take such actions into account by launching two or more pursuing vehicles along the calculated course and one or more offset courses.

The above-identified Bessacini et al. patent application Ser. No. 08/521,207 discloses a method and apparatus that overcome many of the foregoing problems and deficiencies. This method and apparatus provide pre-launch guidance parameters within a short time interval and take evasive action of a target vehicle into account. Models of the pursuing vehicle and target vehicle provide proposed trajectories based upon various environmental considerations and possible evasive tactics. A guidance system uses estimates of initial operating parameter solutions, such as gyro angle, alertment time and intercept time, to begin a convergent, iterative process that defines final operating parameter solutions from which the guidance parameters are determined and transferred to the pursuing vehicle at launch.

In accordance with the disclosed method and apparatus, an operator enters an evasive action as an initial parameter that can be independent of the tactical situation facing the target vehicle. That is, the selection of a particular evasive action is somewhat arbitrary or subjective because the selection is primarily dependent on the experience of an operator at the launching vehicle. While the operator may guess the general nature of an evasive action, the operator determines the evasive action without knowledge, for example, of the actual bearing from the target vehicle to the pursuing vehicle at alertment. However, in general, the target vehicle will base an actual evasive action upon that bearing. The evasive actions that the operator guesses and the target vehicle takes may be the same in general terms; for example, a turn of 90°. However, the actual courses will differ if the base line for the operator's guess is not the bearing on which the actual evasive action is based. Moreover, in some situations, bearing from the target vehicle to the pursuing vehicle might actually dictate an entirely different evasive action from that selected by the operator on the launching vehicle even though only a small difference exists in the situation perceived by the operator in advance and at the target vehicle at alertment.

SUMMARY OF THE INVENTION

Therefore it is an object of this invention to provide a control method and apparatus for producing guidance parameters for use by a pursuing vehicle at launch that take into account potential evasive maneuvers of a target vehicle.

Another object of this invention is to provide a control method and apparatus for providing guidance parameters to a pursuing vehicle for use at launch that take into account an alertment time at which the target vehicle becomes aware of the pursuing vehicle and the effect of any potential evasive maneuvers thereafter.

Yet another object of this invention is to provide a control method and apparatus for providing guidance parameters to a pursuing vehicle for use at launch a short interval after a launching vehicle obtains an estimate of target vehicle state for producing an intercepting trajectory to an alerted target taking evasive action.

In accordance with this invention initial guidance parameters are provided to place a pursuing vehicle on an intercept trajectory from a launching vehicle to a target vehicle with evasion capabilities. At the launching vehicle, the control method and apparatus respond to the initial parameters, a representation of a pursuing vehicle characteristic trajectory derived from a corresponding generic model and a representation of an evading target characteristic trajectory derived from another generic model as inputs for iterative processing. Iterative processing of functional forms of the trajectories, starting with the initial estimates of the operating parameter solutions, provides successive operating parameter solutions that converge. During each iteration, the method and apparatus determine an alertment bearing from the target vehicle to the pursuing vehicle at alertment. This serves as a basis for determining the expected course and speed of the target vehicle as a result of an evasive maneuver, with the course being based upon the alertment bearing. Once convergence has been achieved, the pursuing vehicle receives guidance parameters based upon the last target state estimates and the final solutions.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
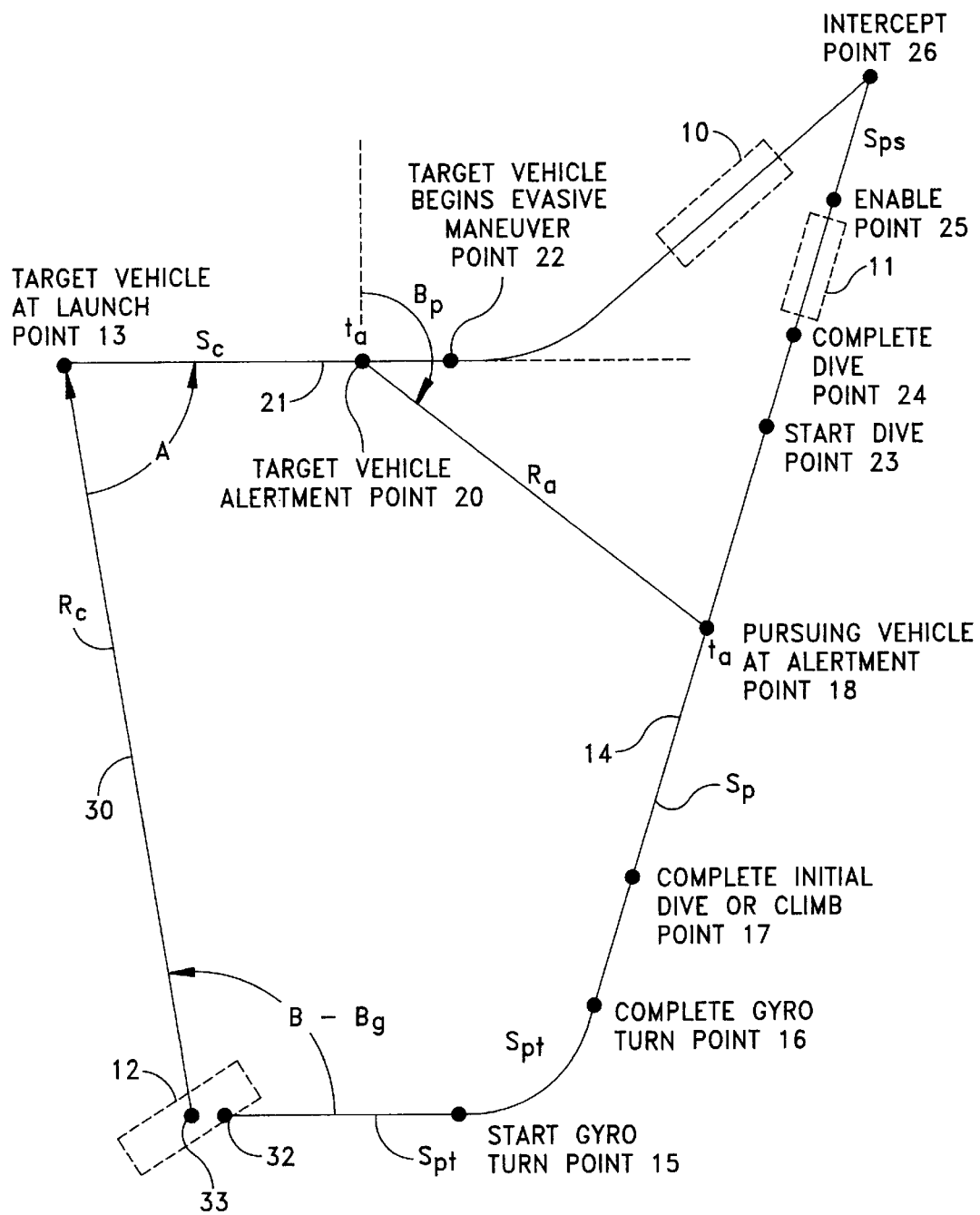
FIG. 1 depicts particular trajectories of a target vehicle and pursuing vehicle on an intercept trajectory.

FIG. 1 depicts typical trajectories of a target vehicle 10 that has the capability of maneuvering evasively. It is assumed that at some point in time a launching vehicle 12 detects the presence of a target vehicle 10 and determines current target vehicle state at a point 13. Target vehicle state includes the bearing and range to the target vehicle and its course and speed. After the pursuing vehicle 11 leaves the launching vehicle 12, it travels along a path 14 that is defined by guidance operating parameters supplied just prior to launch. These operating parameters establish the point at which the pursuing vehicle 11 completes a gyro turn onto an intercept trajectory at point 16, the point of the completion of an initial climb or dive at point 17 and the position of the pursuing vehicle at point 18 when the target vehicle becomes aware or is alerted to the presence of the pursuing vehicle.

This alertment occurs at point 20 on the track 21 of the target vehicle 10. A short time later, at point 22, the target vehicle begins an evasive maneuver, shown in FIG. 1 as a 45° turn to port. After alertment at point 18, the pursuing vehicle 11 may begin and complete a second dive at points 23 and 24 respectively. If the pursuing vehicle 11 contains some instrumentation, such as an acoustic seeker, that instrumentation activates at an enable point 25. The pursuing vehicle 11 continues along the path 14 to the intercept point 26.

Figure 2:
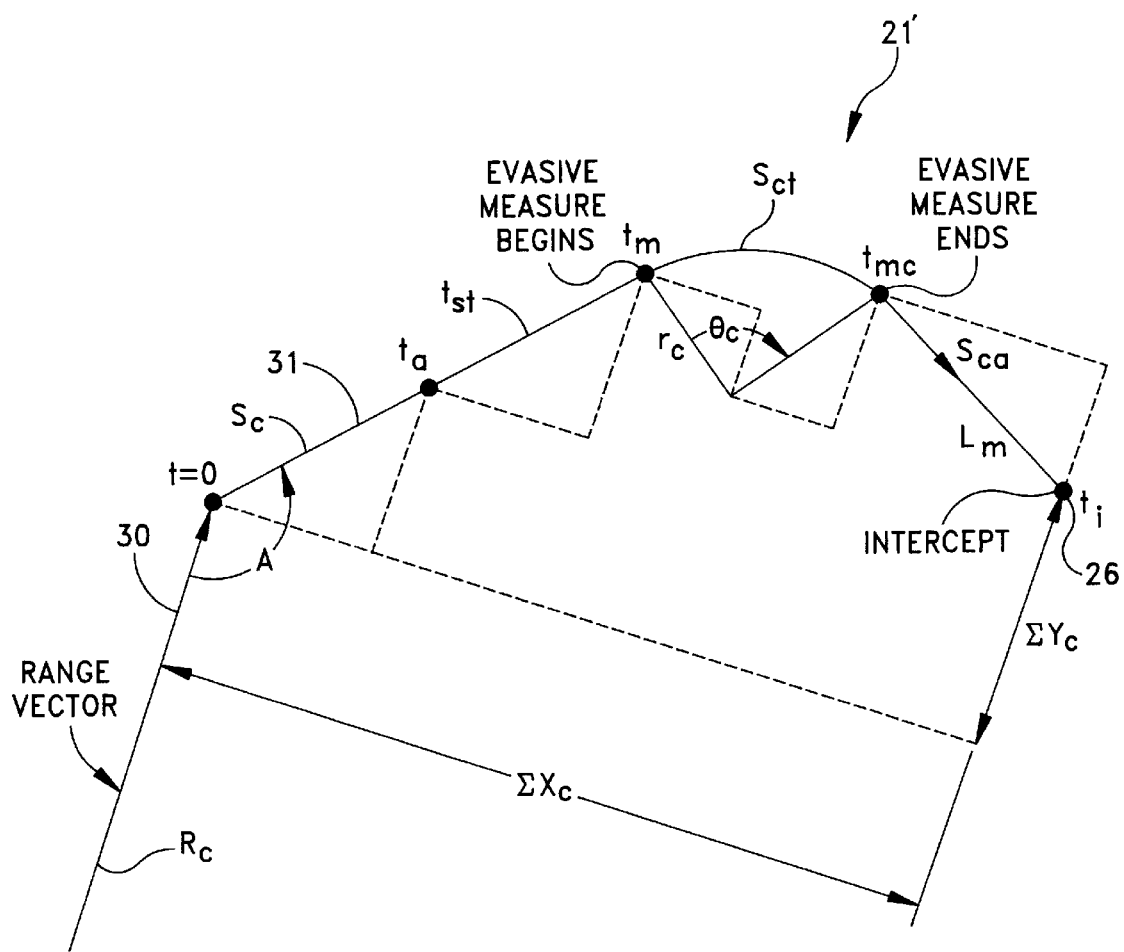
FIG. 2 depicts a generic model for a target vehicle trajectory.

In accordance with this invention, generic models that can be customized for particular events define each of the paths 14 and 21. FIG. 2 depicts a generic model for a target vehicle 10. At t=0, the launching vehicle 12 establishes a range vector 30 and a target velocity vector 31 extending at an angle A with respect to the range vector 30. The generic path can be defined by a sum of X and Y coordinates representing various positions of the target vehicle 10 over time and with respect to a coordinate system aligned with the range vector 30, e.g., a rectangular coordinate system with the Y axis on the range vector 30 and the 0,0 point at the point 33. These times correspond to particular events designated as $t_a$, $t_m$, $t_{mc}$ and $t_i$. The time, $t_a$, corresponds to the time at which the target vehicle 10 detects the pursuing vehicle 11; it is called the alertment time. The time, $t_m$, represents the beginning of an evasive maneuver; the time, $t_{mc}$, the end of that evasive maneuver; the time, $t_i$, the intercept time. The evasive maneuver can be defined as a fixed radius turn having a radius, $r_c$, and an angle, $\theta_c$. As will be described and as shown in FIG. 1, an angle $\theta_c$ in accordance with this invention will depend, in part, on a bearing $B_p$ from the target vehicle 10 to the pursuing vehicle 11 at the alertment time.

After the target vehicle 10 completes an evasive maneuver, it is assumed that the target vehicle continues along a straight line, $S_{ca}$, to an intercept time, $t_i$. The distance from the end of the maneuver to the intercept is $L_m$. Thus the change in positions from $t_o$ to $t_a$ along an X axis perpendicular to and across the line of sight represented by the range vector 30 is $-S_c t_a \sin(A)$; along the Y axis in the line of sight axis, the change is $-S_c T_a \cos(A)$. The position change between the alertment time, $t_a$, and the beginning of the evasive maneuver at $t_m$ can be defined as $-S_c(t_m - t_a)\sin(A)$ across the line of sight and $-S_c(t_m - t_a)\cos(A)$ along the line of sight. The evasive maneuver from $t_m$ to $t_{mc}$ can be defined in terms of the radius, $r_c$, and the angle, $\theta_c$, as $r_c \cos(A) - r_c \cos(A - \theta_c)$ across the line of sight and $-r_c \sin(A) + r_c \sin(A - \theta_c)$ along the line of sight. The change in position from the end of the evasive maneuver to the intercept are given by $-L_m \sin(A - \theta_c)$ and $-L_m \cos(A - \theta_c)$ respectively across and along the line of sight.

Figure 3:
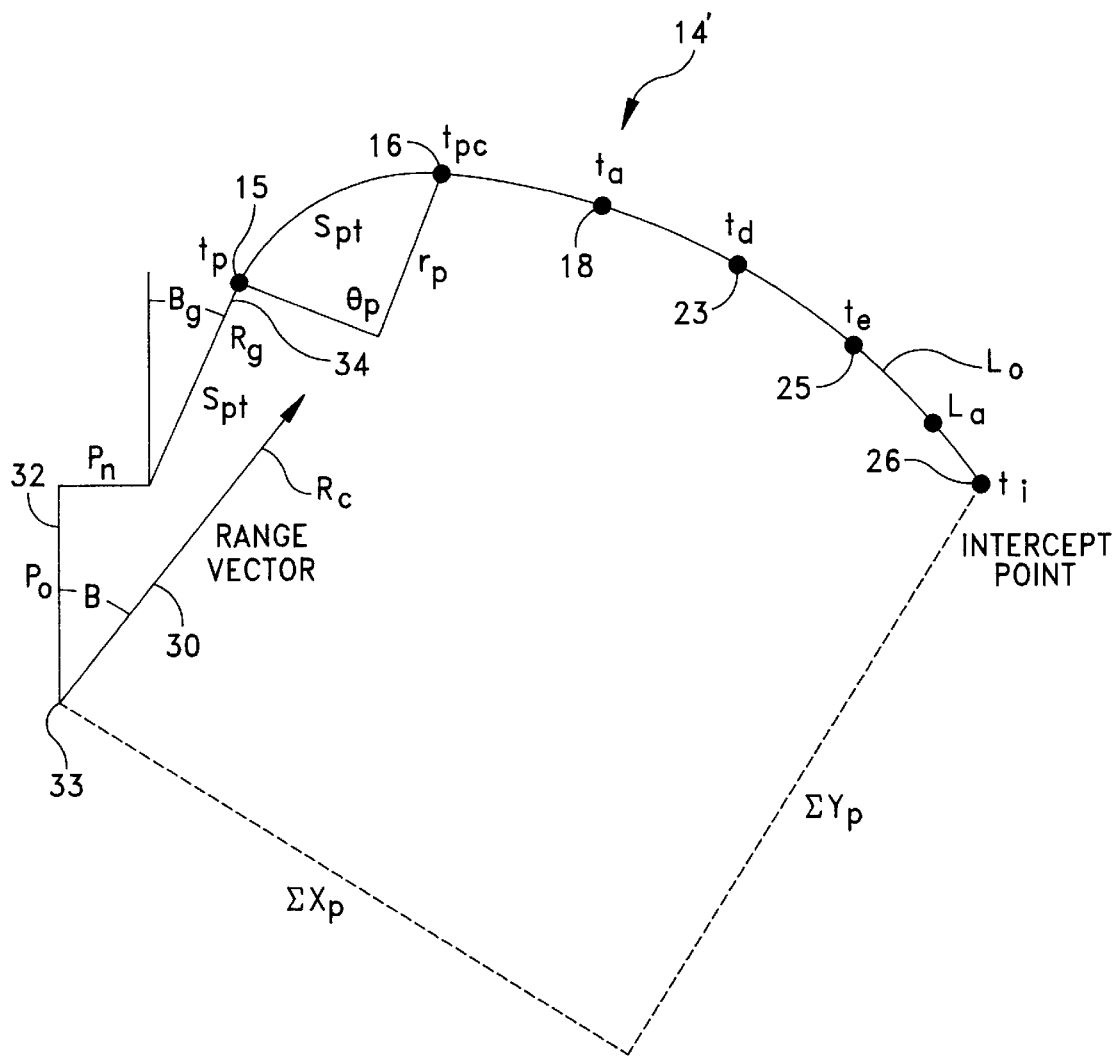
FIG. 3 represents a generic model for a pursuing vehicle trajectory.

Given these incremental definitions, the generic model path 21' in FIG. 2 for a target vehicle 10 is:

$$\sum X_c = -S_c t_a \sin(A) - S_c(t_m - t_a)\sin(A) + \quad (1)$$
$$r_c \cos(A) - r_c \cos(A - \theta_c) - L_m \sin(A - \theta_c)$$

and $$\sum Y_c = -S_c t_a \cos(A) - S_c(t_m - t_a)\cos(A) - \quad (2)$$
$$r_c \sin(A) + r_c \sin(A - \theta_c) - L_m \cos(A - \theta_c)$$

where for $t_i > t_{mc}: L_m = S_{ca}(t_i - t_{mc})$ and $\theta_c = \theta_{cm}$ and where for $t_i \leq t_{mc}: L_m = 0$ and $\theta_c = \theta_{cdot}(t_i - t_m)$ FIG. 3 depicts a generic trajectory 14' for the pursuing vehicle 11. It depicts point 18 as the alertment time, $t_a$, and point 26 as the time of intercept, $t_i$. Assuming that the axis 32 of the launching vehicle 12 is vertical in FIG. 3, the range vector 30 to the target has a bearing B relative to that axis 32. Point 33 in FIGS. 1 and 3 indicates the position of the launching vehicle 12 at the time of launch. In FIG. 3 the distances $P_0$ and $P_n$ define offsets to the center of the torpedo from the reference point of the launching vehicle 12. Segment 34 represents the initial trajectory of the pursuing vehicle 11 for a distance, $R_g$, along an angle, $B_g$, relative to the axis of the launching vehicle. These relationships establish initial launch parameters that co-ordinate the position of the pursuing vehicle at the start of the gyro turn at point 15 in FIGS. 1 and 3; the parameters are: (1) $P_0 \sin(B) - P_n \cos(B) + R_g \sin(B - Bg)$ across the line of sight, and (2) $P_0 \cos(B) + P_n \sin(B) + R_g \cos(B - Bg)$ parallel to the line of sight. An analysis of the remainder of the generic path 14' shows that the path can be defined by $X_p$ and $Y_p$ as follows:

$$\sum X_p = +P_o \sin(B) - P_n \cos(B) + R_g \sin(B - Bg) - \quad (3)$$
$$r_p \cos(B - Bg) + r_p \cos(\theta_p - (B - Bg)) -$$
$$S_p(t_a - t_{pc})\sin\left\{\theta_p - (B - Bg) + \left(\frac{D_r}{2}\right)(t_a - t_{pc})\right\} -$$
$$S_p(t_d - t_a)\sin\{\theta_p - (B - Bg) + D_r(t_a - t_{pc}) +$$
$$\left(\frac{D_r}{2}\right)(t_d - t_a)\} - S_{pd}(t_e - t_d)\sin\{\theta_p - (B - Bg) +$$
$$D_r(t_a - t_{pc}) + D_r(t_d - t_a) + \left(\frac{D_r}{2}\right)(t_e - t_d)\} -$$
$$S_{ps}(t_i - t_e)\sin\{\theta_p - (B - Bg) + D_r(t_a - t_{pc}) +$$
$$D_r(t_d - t_a) + D_r(t_e - t_d) + \left(\frac{D_r}{2}\right)(t_i - t_e)\} -$$
$$L_a \sin\{\theta_p - (B - Bg) + D_r(t_a - t_{pc}) + D_r(t_d - t_a) +$$
$$D_r(t_e - t_d) + D_r(t_i - t_e)\}$$

and $$\sum Y_p = +P_o \cos(B) + P_n \sin(B) + R_g \cos(B - Bg) + \quad (4)$$
$$r_p \sin(B - Bg) + r_p \sin(\theta_p - (B - Bg)) +$$
$$S_p(t_a - t_{pc})\cos\left\{\theta_p - (B - Bg) + \left(\frac{D_r}{2}\right)(t_a - t_{pc})\right\} +$$
$$S_p(t_d - t_a)\cos\{\theta_p - (B - Bg) + D_r(t_a - t_{pc}) +$$
$$\left(\frac{D_r}{2}\right)(t_d - t_a)\} + S_{pd}(t_e - t_d)\cos\{\theta_p - (B - Bg) +$$
$$D_r(t_a - t_{pc}) + D_r(t_d - t_a) + \left(\frac{D_r}{2}\right)(t_e - t_d)\} +$$
$$S_{ps}(t_i - t_e)\cos\{\theta_p - (B - Bg) + D_r(t_a - t_{pc}) +$$
$$D_r(t_d - t_a) + D_r(t_e - t_d) + \left(\frac{D_r}{2}\right)(t_i - t_e)\} +$$
$$L_a \cos\{\theta_p - (B - Bg) + D_r(t_a - t_{pc}) + D_r(t_d - t_a) +$$
$$D_r(t_e - t_d) + D_r(t_i - t_e)\}$$

where $r_p$ and $\theta_p$ represent the radius and included angle of the gyro turn from point 15 to point 16. In these equations, $t_d$ represents the time at the dive point 23 and $t_e$ the time at the enable point 25. $L_0$ represents a distance characteristic of a sensory system, such as an acoustic seeker on a torpedo, and $L_a$ represents an acoustic offset distance or guidance distance. $D_r$ represents a drift rate for the torpedo.

Figure 4:
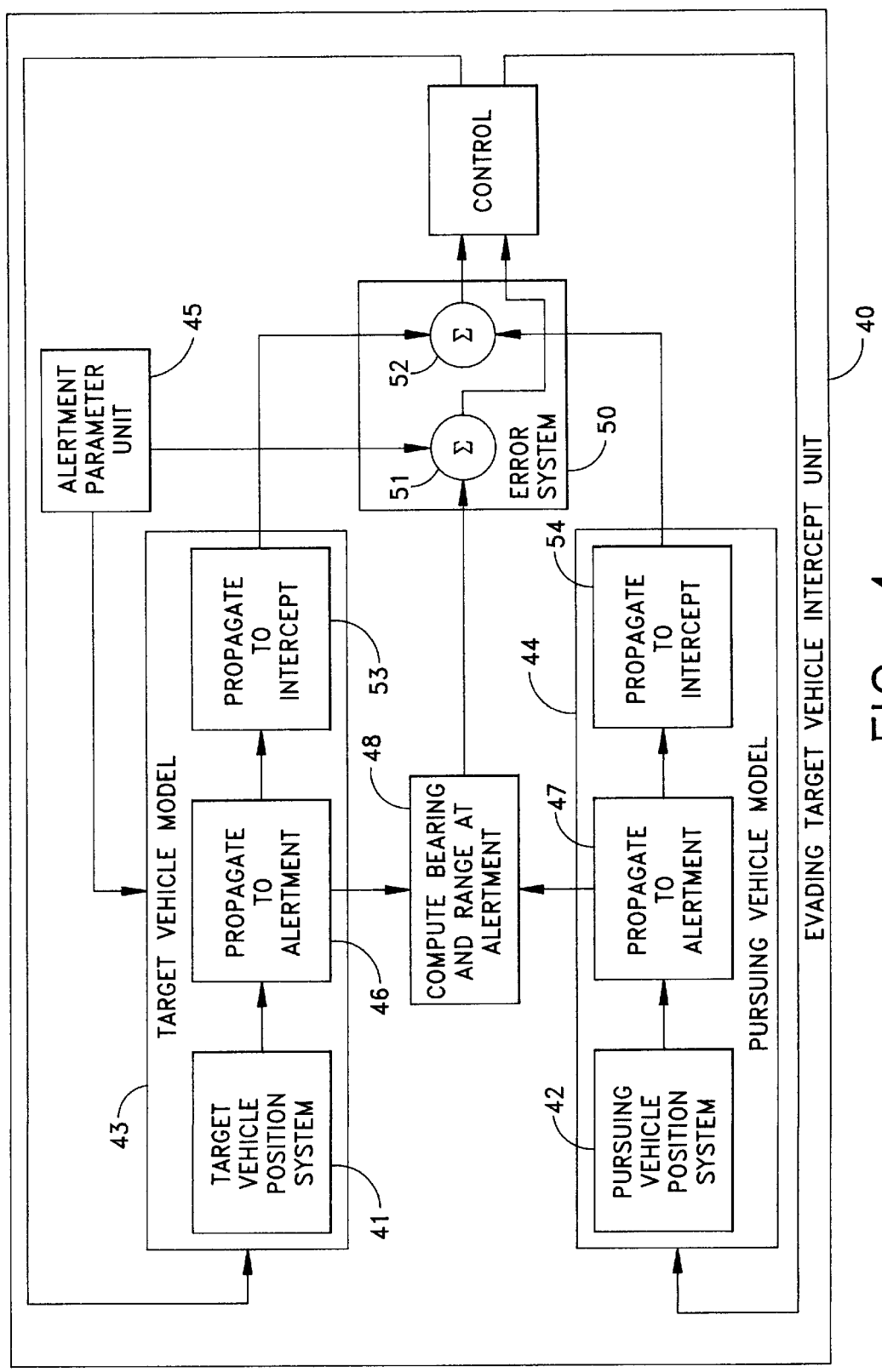
FIG. 4 is a block diagram depicting an evading target vehicle intercept unit constructed in accordance with this invention.

A target vehicle intercept unit 40 shown in FIG. 4 includes a target vehicle position system 41 that implements position equations (1) and (2) and a pursuing vehicle position system 42 that implements equations (3) and (4). Each system includes equipment, not shown but known in the art, for providing particular parameters, such as the turning radius, $r_c$, and rate of turn, $\theta_{cdot}$, shown in FIG. 2. This system also stores different values of the evasive angle $\theta_c$, for different values of the alertment bearing $B_p$ and other conditions. Thus a target vehicle position system 41 generates a representation of an evading target characteristic trajectory based upon the generic model shown in FIG. 2, estimations of the target vehicle state, known characteristics of that target vehicle 10 and, as will be described, estimations of particular maneuvers based upon a particular tactical situation as defined, in part, by the alertment bearing $B_p$. Likewise the pursuing vehicle model 44 uses the pursuing vehicle position system 42 to produce a representation of the pursuing vehicle characteristic trajectory based upon known characteristics of the pursuing vehicle 11.

The range, $R_a$, between point 18 and point 20 in FIG. 1 at the time of alertment $t_a$ constitutes a target vehicle detection range at alertment. Stored information about the target vehicle typically provides the alertment range to the unit 40. Alternatively, an operator can enter the alertment range. In FIG. 4, the source of that range is an alertment parameter unit 45.

This alertment range constrains the computed range between the target vehicle and pursuing vehicle to be equal to the contact detection range at alertment. Using pre-alertment contact target vehicle and pursuing vehicle trajectory components along the line of sight and across the line of sight as defined by the range vector 30, propagate-to-alertment systems 46 and 47 in the target vehicle model 43 and pursuing vehicle model 44, respectively, provide information to a compute bearing and range at alertment system 48 that acts in response to:

$$R_a^2 = +\left[P_o\sin(B) - P_n\cos(B) + R_g\sin(B-Bg) - \right.$$
$$r_p\cos(B-Bg) + r_p\cos(\theta_p - (B-Bg)) -$$
$$S_p(t_a - t_{pc})\sin\left\{\theta_p - (B-Bg) + \left(\frac{D_r}{2}\right)(t_a - t_{pc})\right\} +$$
$$\left.S_c t_a \sin(A)\right]^2 + \left[R_c - S_c t_a \cos(A) - \left\{P_o\cos(B) + \right.\right.$$
$$P_n\sin(B) + R_g\cos(B-Bg) + r_p\sin(B-Bg) +$$
$$r_p\sin(\theta_p - (B-Bg)) + S_p(t_a - t_{pc})\cos\left\{\theta_p - (B-Bg) + \right.$$
$$\left.\left.\left.\left(\frac{D_r}{2}\right)(t_a - t_{pc})\right\}\right\}\right]^2 \quad (5)$$

As previously indicated, the bearing angle $B_p$ is one selection parameter for establishing the nature and timing of an evasive maneuver by the target vehicle 10. More specifically, the system 48 computes the bearing $B_p$ as:

$$Bp = A + (90 - |P|) \text{ for: } \{Xc(t_a) - Xp(t_a)\} < 0 \quad (6)$$

and $$Bp = A - (90 - |P|) \text{ for: } \{Xc(t_a) - Xp(t_a)\} > 0 \quad (7)$$

where $$P = \arctan\{(Yc(t_a) - Yp(t_a))/(Xc(t_a) - Xp(t_a))\} \quad (8)$$

and $$Yc(ta) - Yp(ta) = R_c - S_c t_a \cos(A) - \{P_o\cos(B) + P_n\sin(B) + \quad (9)$$
$$R_g\cos(B-Bg) + r_p\sin(B-Bg) +$$
$$r_p\sin(\theta_p - (B-Bg)) + S_p(t_a - t_{pc})\cos\{\theta_p -$$
$$(B-Bg) + (D_r/2)(t_a - t_{pc})\}$$

and $$Xc(t_a) - Xp(t_a) = -S_c t_a \sin(A) - [P_o\sin(B) - P_n\cos(B) + \quad (10)$$
$$R_g\sin(B-Bg) - r_p\cos(B-Bg) +$$
$$r_p\cos(\theta_p - (B-Bg)) - S_p(t_a - t_{pc})\sin\{\theta_p -$$
$$(B-Bg) + (D_r/2)(t_a - t_{pc})\}]$$

These relationships enable the contact maneuver angle $\theta_c$ to be written as a function of the alertment bearing angle $B_p$ and an angle $C_d$ that represents the desired angle from the bearing $B_p$. For $B_p > \theta$ $$\theta_c = Bp - (180 - C_d) \quad (11)$$

and for $B_p \leq \theta$ $$\theta_c = Bp + (180 - C_d) \quad (12)$$

Consequently more accurate estimations of a target vehicle evasive maneuver are possible because the selection is based upon expected conditions at the time of alertment as viewed from the target vehicle, rather than an arbitrary selection on a maneuver made at the beginning of the process.

In FIG. 4 an error system 50 includes an error unit 51 that produces the alertment range error at alertment for enabling the solution of the foregoing equations within the constraint of the alertment equation (5).

Another error unit 52 produces positional errors with respect to the target vehicle and pursuing vehicle positions across and along the line of sight at intercept. These signals are provided by a propagate-to-intercept system 53 in the target vehicle model 43 and a propagate-to-intercept system 54 in the target vehicle model 44. More specifically, the positional errors in the X and Y directions at intercept result from equating target vehicle and pursuing vehicle components as follows:

$$\sum X_c = \sum X_p, \text{ or} \quad (13)$$
$$-S_c t_a \sin(A) - S_c(t_m - t_a)\sin(A) +$$
$$r_c\cos(A) - r_c\cos(A - \theta_c) - L_m\sin(A - \theta_c)$$
$$= P_o\sin(B) - P_n\cos(B) + R_g\sin(B-Bg) -$$
$$r_p\cos(B-Bg) + r_p\cos(\theta_p - (B-Bg)) -$$
$$S_p(t_a - t_{pc})\sin\left\{\theta_p - (B-Bg) + \left(\frac{D_r}{2}\right)(t_a - t_{pc})\right\} -$$
$$S_p(t_d - t_a)\sin\left\{\theta_p - (B-Bg) + \left(\frac{D_r}{2}\right)(t_d + t_a - 2t_{pc})\right\} - S_{pd}(t_e - t_d)\sin\left\{\theta_p - (B-Bg + \right.$$
$$\left.\left(\frac{D_r}{2}\right)(t_e + t_d - 2t_{pc})\right\} - S_{ps}(t_i - t_e)\sin\left\{\theta_p - \right.$$
$$\left.(B-Bg) + \left(\frac{D_r}{2}\right)(t_i + t_e - 2t_{pc})\right\} -$$
$$L_a\sin\{\theta_p - (B-Bg) + D_r(t_i - t_{pc})\}$$

and $$R_c + \sum Y_c = \sum Y_p, \text{ or} \quad (14)$$
$$R_c - S_c t_a \cos(A) - S_c(t_m - t_a)\cos(A) -$$
$$r_c\sin(A) + r_c\sin(A - \theta_c) - L_m\cos(A - \theta_c)$$
$$= P_o\cos(B) + P_n\sin(B) + R_g\cos(B-Bg) +$$
$$r_p\sin(B-Bg) + r_p\sin(\theta_p - (B-Bg)) +$$
$$S_p(t_a - t_{pc})\cos\left\{\theta_p - (B-Bg) + \left(\frac{D_r}{2}\right)(t_a - t_{pc})\right\} +$$
$$S_p(t_d - t_a)\cos\left\{\theta_p - (B-Bg) + \right.$$
$$\left.\left(\frac{D_r}{2}\right)(t_d + t_a - 2t_{pc})\right\} + S_{pd}(t_e - t_d)\cos\left\{\theta_p - \right.$$
$$\left.(B-Bg) + \left(\frac{D_r}{2}\right)(t_e + t_d - 2t_{pc})\right\} +$$
$$S_{ps}(t_i - t_e)\cos\left\{\theta_p - (B-Bg) + \right.$$
$$\left.\left(\frac{D_r}{2}\right)(t_i + t_e - 2t_{pc})\right\} + L_a\cos\{\theta_p - (B-Bg) +$$
$$D_r(t_i - t_{pc})\}.$$

By inspection of FIGS. 1 through 3 the following relationships exist:

$$t_m = t_a + t_{st}$$

$$t_{mc} = t_a + t_{st} + r_c(\theta_c)/S_{ct}$$

$$t_{pc} = [R_g + r_p(\theta_p)]/S_{pt} \qquad (5)$$

$$t_p = R_g/S_{pt}$$

$$t_{srch} = L_0/S_{ps}$$

$$t_e - t_d = L_d/S_{pd} \qquad (10)$$

$$t_{dive} = L_d/S_{pd}$$

$$L_{xr} = P_0\sin(B) - P_n\cos(B) + R_g\sin(B - Bg)$$

$$L_{xc} = r_c\cos(A) - S_{ct_{st}}\sin(A)$$

$$L_{yr} = P_0\cos(B) + P_n\sin(B) + R_g\cos(B - Bg)$$

$$L_{yc} = R_c - r_c\sin(A) - S_{ct_{st}}\cos(A)$$

$$B_1 = (B - Bg)$$

$$B_2 = (L_0/S_{ps} + L_d/S_{pd}) \qquad (20)$$

where $t_{st}$ represents the reaction time of the target vehicle between alertment and the beginning of an evasive maneuver, $S_{ct}$ represents speed of the target vehicle during the evasive turn, for $t_{pc} = [R_g + r_p(\theta_p)]/S_{pt}$, $S_{pt}$ equals the speed of the pursuing vehicle during the gyro turn, and for $t_p = R_g/S_{pt}$, $S_{pt}$ is the speed with which the pursuing vehicle 11 leaves the launching vehicle 12, $L_O$ represents the seeker offset distance and $S_{ps}$ equals the speed of the pursuing vehicle in a search phase, $L_d$ is the distance from point 23 to point 24 in FIG. 1, $L_d$ represents the distance travelled by the pursuing vehicle during a dive phase, and $S_{pd}$ represents the speed of the pursuing vehicle during the dive.

Substituting these relationships in equations (13) and (14) yields positional errors given by:

$$0 = L_{xr} - L_{xc} - r_p\cos(B_1) + r_c\cos(A - \theta_c) + \qquad (15)$$
$$S_{ct_a}\sin(A) + L_m\sin(A - \theta_c) + r_p\cos(\theta_p - B_1) -$$
$$S_p\left(t_a - \frac{R_g + r_p\theta_p}{S_{pt}}\right)\sin\left\{\theta_p - B_1 + \left(\frac{D_r}{2}\right)\left(t_a - \frac{R_g + r_p\theta_p}{S_{pt}}\right)\right\} - S_p\left(t_e - t_a - \frac{L_d}{S_{pd}}\right)\sin\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} - L_d\sin\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\} - S_{ps}(t_i - t_e)\sin\left\{\theta_p - B_1 + \left(\frac{D_r}{2}\right)\left(t_i + t_e - 2\frac{R_g + r_p\theta_p}{S_{pt}}\right)\right\} - L_a\sin\left\{\theta_p - B_1 + D_r\left(t_i - \frac{R_g + r_p\theta_p}{S_{pt}}\right)\right\}$$

and $$0 = L_{yr} - L_{yc} + r_p\sin(B_1) - r_c\sin(A - \theta_c) + S_{ct_a}\cos(A) + \qquad (16)$$
$$L_m\cos(A - \theta_c) + r_p\sin(\theta_p - B_1) +$$
$$S_p\left(t_a - \frac{R_g + r_p\theta_p}{S_{pt}}\right)\cos\left\{\theta_p - B_1 + \left(\frac{D_r}{2}\right)\left(t_a - \right.\right.$$
$$\left.\left.\frac{R_g + r_p\theta_p}{S_{pt}}\right)\right\} + S_p\left(t_e - t_a - \frac{L_d}{S_{pd}}\right)\cos\left\{\theta_p - B_1 + \right.$$
$$\left.\left(\frac{D_r}{2}\right)\left(t_a + t_e - \frac{L_d}{S_{pd}} - 2\frac{R_g + r_p\theta_p}{S_{pt}}\right)\right\} + (L_d)\cos\left\{\theta_p - B_1 + \right.$$
$$\left.\left(\frac{D_r}{2}\right)\left(2t_e - \frac{L_d}{S_{pd}} - 2\frac{R_g + r_p\theta_p}{S_{pt}}\right)\right\} + S_{ps}(t_i - t_e)\cos\left\{\theta_p - \right.$$
$$\left.B_1 + \left(\frac{D_r}{2}\right)\left(t_i + t_e - 2\frac{R_g + r_p\theta_p}{S_{pt}}\right)\right\} +$$
$$L_a\cos\left\{\theta_p - B_1 + D_r\left(t_i - \frac{R_g + r_p\theta_p}{S_{pt}}\right)\right\}$$

There are two ways to define the time, $t_e$, at which an acoustic seeker or other instrumentation or feature is enabled. In one, the time is defined as the time to travel a fixed turn-on distance, $L_{sto}$, from the launch point. In another, the time is defined as the time to travel a fixed seeker offset distance, $L_o$. If $L_{sto}$ is selected, then $$t_e = \frac{L_{sto} - L_d}{S_p} + \frac{L_d}{S_{pd}} \qquad (17)$$

otherwise $$t_e = t_i - \frac{L_o}{S_{ps}} \qquad (18)$$

Likewise substituting the foregoing relationships in equation (5) yields an alertment range error defined by:

$$0 = \left[L_{xr} - r_p\cos(B_1) + r_p\cos(\theta_p - B_1) - \qquad (19)\right.$$
$$S_p\left(t_a - \frac{R_g + r_p\theta_p}{S_{pt}}\right)\sin\left\{\theta_p - B_1 + \left(\frac{D_r}{2}\right)\left(t_a - \right.\right.$$
$$\left.\left.\frac{R_g + r_p\theta_p}{S_{pt}}\right)\right\} + S_c t_a\sin(A)\right]^2 + \left[R_c - S_c t_a\cos(A) - \left\{L_{yr} + \right.\right.$$
$$r_p\sin(B_1) + r_p\sin(\theta_p - B_1) + S_p\left(t_a - \right.$$
$$\left.\frac{R_g + r_p\theta_p}{S_{pt}}\right)\cos\left\{\theta_p - B_1 + \left(\frac{D_r}{2}\right)\left(t_a - \frac{R_g + r_p\theta_p}{S_{pt}}\right)\right\}\right\}\right]^2 - R_a^2$$

The evading target vehicle intercept unit 40 operates in accordance with equations (15), (16) and (19) to generate control updates required to converge to an intercept solution. As previously indicated, these equations are not readily solved because they are transcendental in nature and do not lend themselves to a solution in a closed form. In accordance with this invention, however, initial estimates of operating parameter solutions that characterize a particular trajectory of the pursuing vehicle based upon defined interactions of the representations of the pursuing vehicle and target vehicle trajectories can be produced. Then iterative processing provides successive operating parameter solutions that converge to provide a set of guidance parameters for the pursuing vehicle. In accordance with this invention, the guidance parameters are generated from the numerical solution that exhibits particularly rapid convergence characteristics and accurate estimates.

Expressing equations (15), (16) and (19) as general functions of the problem unknowns and performing a Taylor series expansion yields:

$$e(t_a, t_i, \theta_p) = e(t_{a_i}, t_{i_i}, \theta_{p_i}) + h\partial e/\partial t_a|_i + j\partial e/\partial t_i|_i + k\partial e/\partial \theta_p|_i + \ldots = 0 \qquad (20)$$

and $$f(t_a, t_i, \theta_p) = f(t_{a_i}, t_{i_i}, \theta_{p_i}) + h\partial f/\partial t_a|_i + j\partial f/\partial t_i|_i + k\partial f/\partial \theta_p|_i + \ldots = 0 \qquad (21)$$

and $$g(t_a, t_i, \theta_p) = g(t_{a_i}, t_{i_i}, \theta_{p_i}) + h\partial g/\partial t_a|_i + j\partial g/\partial t_i|_i + k\partial g/\partial \theta_p|_i + \ldots = 0 \qquad (22)$$

where, $$(\partial e/\partial t_a)|_i = \partial e/\partial t_a|_{t_a=t_{a_i}, t_i=t_{i_i}, \theta_p=\theta_{p_i}}, \qquad (23)$$

and, $$t_a = t_{a_i} + h, \; t_i = t_{i_i} + j, \; \theta_p = \theta_{p_i} + k. \qquad (24)$$

Neglecting the higher order terms, the solution for this linear set of three expressions with three unknowns is:

$$h = \frac{C22(g_i C13 - e_i C33) + C23(e_i C32 - g_i C12) + f_i(C33C12 - C13C32)}{\Delta} \qquad (25)$$

and $$j = \frac{f_i(C31C13 - C11C33) + C23(g_i C11 - e_i C31) + C21(e_i C33 - g_i C13)}{\Delta} \qquad (26)$$

and $$k = \frac{C22(e_i C31 - g_i C11) + f_i(C32C11 - C12C31) + C21(g_i C12 - e_i C32)}{\Delta} \qquad (27)$$

and $$\Delta = C11(C22C33 - C32C23) + C12(C23C31 - C33C21) + C13(C21C32 - C31C22) \qquad (28)$$

where $e_i$, $f_i$ and $g_i$ are given by equations (15), (16) and (19) respectively. The partial derivatives in equations (25) through (28) are:

$$C11 = \frac{\partial e}{\partial t_a} \qquad (29)$$

$$= r_c \frac{\partial \theta_c}{\partial t_a} \sin(A - \theta_c) + S_c \sin(A) - L_m \frac{\partial \theta_c}{\partial t_a} \cos(A - \theta_c) +$$

$$\frac{\partial L_m}{\partial t_a} \sin(A - \theta_c) -$$

$$S_p \left( t_a - \frac{R_g + r_p \theta_p}{S_{pt}} \right) \left( \frac{D_r}{2} \right) \cos\left\{ \theta_p - B_1 + \left( \frac{D_r}{2} \right) \left( t_a - \frac{R_g + r_p \theta_p}{S_{pt}} \right) \right\} -$$

-continued $$S_p \sin\left\{ \theta_p - B_1 + \left( \frac{D_r}{2} \right) \left( t_a - \frac{R_g + r_p \theta_p}{S_{pt}} \right) \right\} - S_p \left( t_e - t_a - \frac{L_d}{S_{pd}} \right) \left( \frac{D_r}{2} \right) \cos\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} + S_p \sin\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\}$$

and $$C12 = \frac{\partial e}{\partial t_i} \qquad (30)$$

$$= r_c \frac{\partial \theta_c}{\partial t_i} \sin(A - \theta_c) - L_m \frac{\partial \theta_c}{\partial t_i} \cos(A - \theta_c) +$$

$$\frac{\partial L_m}{\partial t_i} \sin(A - \theta_c) - S_{ps}(t_i - t_e) \left( \frac{D_r}{2} \right) \left( 1 + \frac{\partial t_e}{\partial t_i} \right) \cos\left\{ \theta_p - B_1 + \left( \frac{D_r}{2} \right) \left( t_i + t_e - 2\frac{R_g + r_p \theta_p}{S_{pt}} \right) \right\} -$$

$$S_{ps} \left( 1 - \frac{\partial t_e}{\partial t_i} \right) \sin\left\{ \theta_p - B_1 + \left( \frac{D_r}{2} \right) \left( t_i + t_e - 2\frac{R_g + r_p \theta_p}{S_{pt}} \right) \right\} -$$

$$L_d(D_r) \cos\left\{ \theta_p - B_1 + (D_r)\left( t_i - \frac{R_g + r_p \theta_p}{S_{pt}} \right) \right\} -$$

$$S_p \left( t_e - t_a - \frac{L_d}{S_{pd}} \right) \left( \frac{D_r}{2} \right) \frac{\partial t_e}{\partial t_i} \cos\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} - S_p \frac{\partial t_e}{\partial t_i} \sin\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} - L_d D_r \frac{\partial t_e}{\partial t_i} \cos\left\{ \theta_p - B_1 + \left( \frac{D_r}{2} \right) \left( 2t_e - \frac{L_d}{S_{pd}} - 2\frac{R_g + r_p \theta_p}{S_{pt}} \right) \right\}$$

and $$C13 = \frac{\partial e}{\partial \theta_p} \qquad (31)$$

$$= -r_p \sin(\theta_p - B_1) + r_c \left( \frac{\partial \theta_c}{\partial \theta_p} \right) \sin(A - \theta_c) -$$

$$S_p \left( t_a - \frac{R_g + r_p \theta_p}{S_{pt}} \right) \left( \frac{1 - D_r r_p}{2S_{pt}} \right) \cos\left\{ \theta_p - B_1 + \left( \frac{D_r}{2} \right) \left( t_a - \frac{R_g + r_p \theta_p}{S_{pt}} \right) \right\} + \frac{S_p r_p}{S_{pt}} \sin\left\{ \theta_p - B_1 + \left( \frac{D_r}{2} \right) \left( t_a - \frac{R_g + r_p \theta_p}{S_{pt}} \right) \right\} - S_p \left( t_e - t_a - \frac{L_d}{S_{pd}} \right) \left( 1 - \frac{D_r r_p}{S_{pt}} \right) \cos\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} -$$

$$(L_d)\left( 1 - \frac{D_r r_p}{S_{pt}} \right) \cos\left\{ \theta_p - B_1 + \left( \frac{D_r}{2} \right) \left( 2t_e - \frac{L_d}{S_{pd}} - 2\frac{R_g + r_p \theta_p}{S_{pt}} \right) \right\} - S_{ps}(t_i - t_e)\left( 1 - \frac{D_r r_p}{S_{pt}} \right) \cos\left\{ \theta_p - B_1 + \left( \frac{D_r}{2} \right) \left( t_i + t_e - 2\frac{R_g + r_p \theta_p}{S_{pt}} \right) \right\} - L_a \left( 1 - \frac{D_r r_p}{S_{pt}} \right) \cos\left\{ \theta_p - B_1 + (D_r)\left( t_i - \frac{R_g + r_p \theta_p}{S_{pt}} \right) \right\} - L_m \left( \frac{\partial \theta_c}{\partial \theta_p} \right) \cos(A - \theta_c) +$$

$$\left( \frac{\partial L_m}{\partial \theta_p} \right) \sin(A - \theta_c)$$

and $$C21 = \frac{\partial f}{\partial t_a} \quad (32)$$

$$= r_c \frac{\partial \theta_c}{\partial t_a} \cos(A - \theta_c) + S_c \cos(A) + L_m \frac{\partial \theta_c}{\partial t_a} \sin(A - \theta_c) +$$

$$\frac{\partial L_m}{\partial t_a} \cos(A - \theta_c) - S_p \left( t_a - \frac{R_g + r_p \theta_p}{S_{pt}} \right) \left( \frac{D_r}{2} \right) \sin\left\{ \theta_p - B_1 + \left( \frac{D_r}{2} \right) \left( t_a - \frac{R_g + r_p \theta_p}{S_{pt}} \right) \right\} + S_p \cos\left\{ \theta_p - B_1 + \left( \frac{D_r}{2} \right) \left( t_a - \frac{R_g + r_p \theta_p}{S_{pt}} \right) \right\} - S_p \left( t_e - t_a - \frac{L_d}{S_{pd}} \right) \left( \frac{D_r}{2} \right) \sin\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} -$$

$$S_p \cos\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\}$$

and $$C22 = \frac{\partial f}{\partial t_i} \quad (33)$$

$$= r_c \frac{\partial \theta_c}{\partial t_i} \cos(A - \theta_c) + L_m \frac{\partial \theta_c}{\partial t_i} \sin(A - \theta_c) + \frac{\partial L_m}{\partial t_i} \cos(A - \theta_c) -$$

$$S_{ps}(t_i - t_e) \left( \frac{D_r}{2} \right) \left( 1 + \frac{\partial t_e}{\partial t_i} \right) \sin\left\{ \theta_p - B_1 + \left( \frac{D_r}{2} \right) \left( t_i + t_e - 2\frac{R_g + r_p \theta_p}{S_{pt}} \right) \right\} + S_{ps} \left( 1 - \frac{\partial t_e}{\partial t_i} \right) \cos\left\{ \theta_p - B_1 + \left( \frac{D_r}{2} \right) \left( t_i + t_e - 2\frac{R_g + r_p \theta_p}{S_{pt}} \right) \right\} - L_a (D_r) \sin\left\{ \theta_p - B_1 + (D_r) \left( t_i - \frac{R_g + r_p \theta_p}{S_{pt}} \right) \right\} - S_p \left( t_e - t_a - \frac{L_d}{S_{pd}} \right) \left( \frac{D_r}{2} \right) \frac{\partial t_e}{\partial t_i} \sin\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} +$$

$$S_p \frac{\partial t_e}{\partial t_i} \cos\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} -$$

$$L_d D_r \frac{\partial t_e}{\partial t_i} \sin\left\{ \theta_p - B_1 + \left( \frac{D_r}{2} \right) \left( 2t_e - \frac{L_d}{S_{pd}} - 2\frac{R_g + r_p \theta_p}{S_{pt}} \right) \right\}$$

and $$C23 = \frac{\partial f}{\partial \theta_p} \quad (34)$$

$$= r_p \cos(\theta_p - B_1) + L_m \left( \frac{\partial \theta_c}{\partial \theta_p} \right) \cos(A - \theta_c) +$$

$$\left( \frac{\partial L_m}{\partial \theta_p} \right) \sin(A - \theta_c) - S_p \left( t_a - \frac{R_g + r_p \theta_p}{S_{pt}} \right) \left( \frac{1 - D_r r_p}{2 S_{pt}} \right) \sin\left\{ \theta_p - B_1 + \left( \frac{D_r}{2} \right) \left( t_a - \frac{R_g + r_p \theta_p}{S_{pt}} \right) \right\} - \frac{S_p r_p}{S_{pt}} \cos\left\{ \theta_p - B_1 + \left( \frac{D_r}{2} \right) \left( t_a - \frac{R_g + r_p \theta_p}{S_{pt}} \right) \right\} -$$

$$\left( \frac{D_r}{2} \right) \left( t_a - \frac{R_g + r_p \theta_p}{S_{pt}} \right) - S_p \left( t_e - t_a - \frac{L_d}{S_{pd}} \right) \left( 1 - \frac{D_r r_p}{S_{pt}} \right) \sin\left\{ \theta_p - B_1 + \left( \frac{D_r}{2} \right) \left( t_a + t_e - \frac{L_d}{S_{pd}} - 2\frac{R_g + r_p \theta_p}{S_{pt}} \right) \right\} -$$

$$(L_d) \left( 1 - \frac{D_r r_p}{S_{pt}} \right) \sin\left\{ \theta_p - B_1 + \left( \frac{D_r}{2} \right) \left( 2t_e - \frac{L_d}{S_{pd}} - 2\frac{R_g + r_p \theta_p}{S_{pt}} \right) \right\} - S_{ps} (t_i - t_e) \left( 1 - \frac{D_r r_p}{S_{pt}} \right) \sin\left\{ \theta_p - B_1 + \left( \frac{D_r}{2} \right) \left( t_i + t_e - 2\frac{R_g + r_p \theta_p}{S_{pt}} \right) \right\} - L_a \left( 1 - \frac{D_r r_p}{S_{pt}} \right) \sin\left\{ \theta_p - B_1 + (D_r) \left( t_i - \frac{R_g + r_p \theta_p}{S_{pt}} \right) \right\}$$

and $$C31 = \frac{\partial g}{\partial t_a} \quad (35)$$

$$= 2\{PAR1\} \left[ -S_p \left( t_a - \frac{R_g + r_p \theta_p}{S_{pt}} \right) \left( \frac{D_r}{2} \right) \cos\left\{ \theta_p - B_1 + \left( \frac{D_r}{2} \right) \left( t_a - \frac{R_g + r_p \theta_p}{S_{pt}} \right) \right\} - S_p \sin\left\{ \theta_p - B_1 + \left( \frac{D_r}{2} \right) \left( t_a - \frac{R_g + r_p \theta_p}{S_{pt}} \right) \right\} + S_c \sin(A) \right] +$$

$$2\{PAR2\} \left[ -S_c \cos(A) - \left\{ -S_p \left( t_a - \frac{R_g + r_p \theta_p}{S_{pt}} \right) \left( \frac{D_r}{2} \right) \sin\left\{ \theta_p - B_1 + \left( \frac{D_r}{2} \right) \left( t_a - \frac{R_g + r_p \theta_p}{S_{pt}} \right) \right\} + S_p \cos\left\{ \theta_p - B_1 + \left( \frac{D_r}{2} \right) \left( t_a - \frac{R_g + r_p \theta_p}{S_{pt}} \right) \right\} \right\} \right]$$

and $$C32 = \frac{\partial g}{\partial t_i} = 0 \quad (36)$$

and $$C33 = \partial g / \partial \theta_p \quad (37)$$

$$= 2PAR1 \left[ -r_p \sin(\theta_p - B_1) - S_p \left( t_a - \frac{R_g + r_p \theta_p}{S_{pt}} \right) \left( 1 - \frac{D_r r_p}{2 S_{pt}} \right) \cos\left\{ \theta_p - B_1 + \left( \frac{D_r}{2} \right) \left( t_a - \frac{R_g + r_p \theta_p}{S_{pt}} \right) \right\} + \frac{S_p r_p}{S_{pt}} \sin\left\{ \theta_p - B_1 + \left( \frac{D_r}{2} \right) \left( t_a - \frac{R_g + r_p \theta_p}{S_{pt}} \right) \right\} \right] +$$

$$2PAR2 \left[ -\left\{ r_p \cos(\theta_p - B_1) - S_p \left( t_a - \frac{R_g + r_p \theta_p}{S_{pt}} \right) \left( 1 - \frac{D_r r_p}{2 S_{pt}} \right) \sin\left\{ \theta_p - B_1 + \left( \frac{D_r}{2} \right) \left( t_a - \frac{R_g + r_p \theta_p}{S_{pt}} \right) \right\} - \left( \frac{S_p r_p}{S_{pt}} \right) \cos\left\{ \theta_p - B_1 + \left( \frac{D_r}{2} \right) \left( t_a - \frac{R_g + r_p \theta_p}{S_{pt}} \right) \right\} \right\} \right]$$

where $$PAR1 = L_{xr} - r_p \cos(B_1) + r_p \cos(\theta_p - B_1) - \quad (38)$$

$$S_p \left( t_a - \frac{R_g + r_p \theta_p}{S_{pt}} \right) \sin\left\{ \theta_p - B_1 + \left( \frac{D_r}{2} \right) \left( t_a - \frac{R_g + r_p \theta_p}{S_{pt}} \right) \right\} + S_c t_a \sin(A)$$

and $$PAR2 = R_c - S_c t_a \cos(A) - \left\{ L_{yr} + r_p \sin(B_1) + r_p \sin(\theta_p - B_1) + \quad (39) \right.$$

$$\left. S_p \left( t_a - \frac{R_g + r_p \theta_p}{S_{pt}} \right) \cos\left\{ \theta_p - B_1 + \left( \frac{D_r}{2} \right) \left( t_a - \frac{R_g + r_p \theta_p}{S_{pt}} \right) \right\} \right\}$$

In addition, the value of $\theta_c$ now is a variable that depends upon the bearing $B_p$ and therefore the absolute magnitude of P. Thus the partial derivatives of $\theta_c$ with respect to $t_a$, $\theta_p$ and $t_i$ are:

$$\frac{\partial \theta_c}{\partial t_a} = \frac{\partial(\pm|P|)}{\partial t_a} = \left(\frac{\pm \text{sgn } f(t_a)}{1+[f(t_a)]^2}\right)\left(\frac{\partial f(t_a)}{\partial t_a}\right) \quad (40)$$

$$\frac{\partial \theta_c}{\partial \theta_p} = \frac{\partial(\pm|P|)}{\partial \theta_p} = \left(\frac{\pm \text{sgn } f(t_a)}{1+[f(t_a)]^2}\right)\left(\frac{\partial f(t_a)}{\partial \theta_p}\right) \quad (41)$$

where $$f(t_a) = \frac{Y_c(t_a) - Y_p(t_a)}{X_c(t_a) - X_p(t_a)} \quad (42)$$

and $$\partial f(t_a)/\partial t_a = ([X_c(t_a) - X_p(t_a)]\{-S_c\cos(A) + S_p(t_a - (R_g + \quad (43)$$
$$r_p(\theta_p))/S_{pt})(D_r/2)\sin\{\theta_p - B_1 + (D_r/2)(t_a -$$
$$(R_g + r_p(\theta_p))/S_{pt})\} - S_p\cos\{\theta_p - B_1 +$$
$$(D_r/2)(t_a - (R_g + r_p(\theta_p))/S_{pt})\}\} - [Y_c(t_a) -$$
$$Y_p(t_a)]\{-S_c\sin(A) + S_p(t_a - (R_g + r_p(\theta_p))/$$
$$S_{pt})D_r/2)\cos\{\theta_p - B_1 + (D_r/2)(t_a - (R_g +$$
$$r_p(\theta_p))/S_{pt})\} + S_p\sin\{\theta_p - B_1 + (D_r/2)(t_a -$$
$$(R_g + r_p(\theta_p))/S_{pt})\}\})/[X_c(t_a) - X_p(t_a)]^2$$

and $$\partial f(t_a)/\partial \theta_p = ([X_c(t_a) - X_p(t_a)]\{-r_p\cos(\theta_p - B_1) + S_p(t_a - \quad (44)$$
$$(R_g + r_p(\theta_p))/S_{pt})(1 - D_r r_p/2S_{pt})\sin\{\theta_p -$$
$$B_1 + (D_r/2)(t_a - (R_g + r_p(\theta_p))/S_{pt})\} +$$
$$(S_p r_p/S_{pt})\cos\{\theta_p - B_1 + (D_r/2)(t_a - (R_g +$$
$$r_p(\theta_p))/S_{pt})\}\} - [Y_c(t_a) - Y_p(t_a)]\{-r_p\sin(\theta_p -$$
$$B_1) + S_p(t_a - (R_g + r_p(\theta_p))/S_{pt})(1 -$$
$$D_r r_p/2S_{pt})\cos\{\theta_p - B_1 + (D_r/2)(t_a - (R_g +$$
$$r_p(\theta_p))/S_{pt})\} - (S_p r_p/S_{pt})\sin\{\theta_p - B_1 +$$
$$(D_r/2)(t_a - (R_g + r_p(\theta_p))/S_{pt})\}\})/$$
$$[X_c(t_a) - X_p(t_a)]^2$$

and $$\partial \theta_c/\partial t_i = 0 \quad (45)$$

Figure 5A:
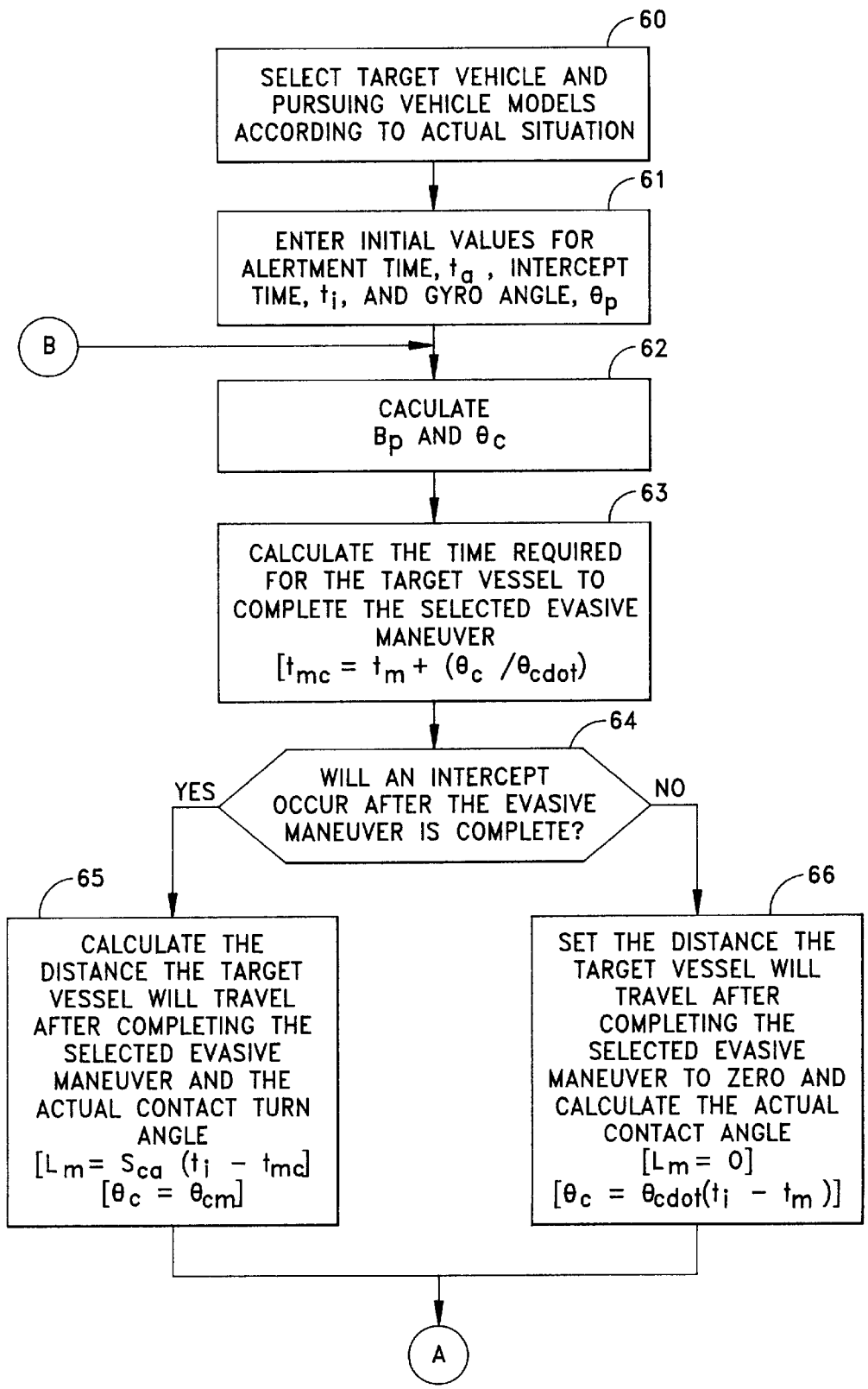
FIGS. 5A and 5B depict the operation of the evading target vehicle intercept unit in FIG. 4.
Figure 5B:
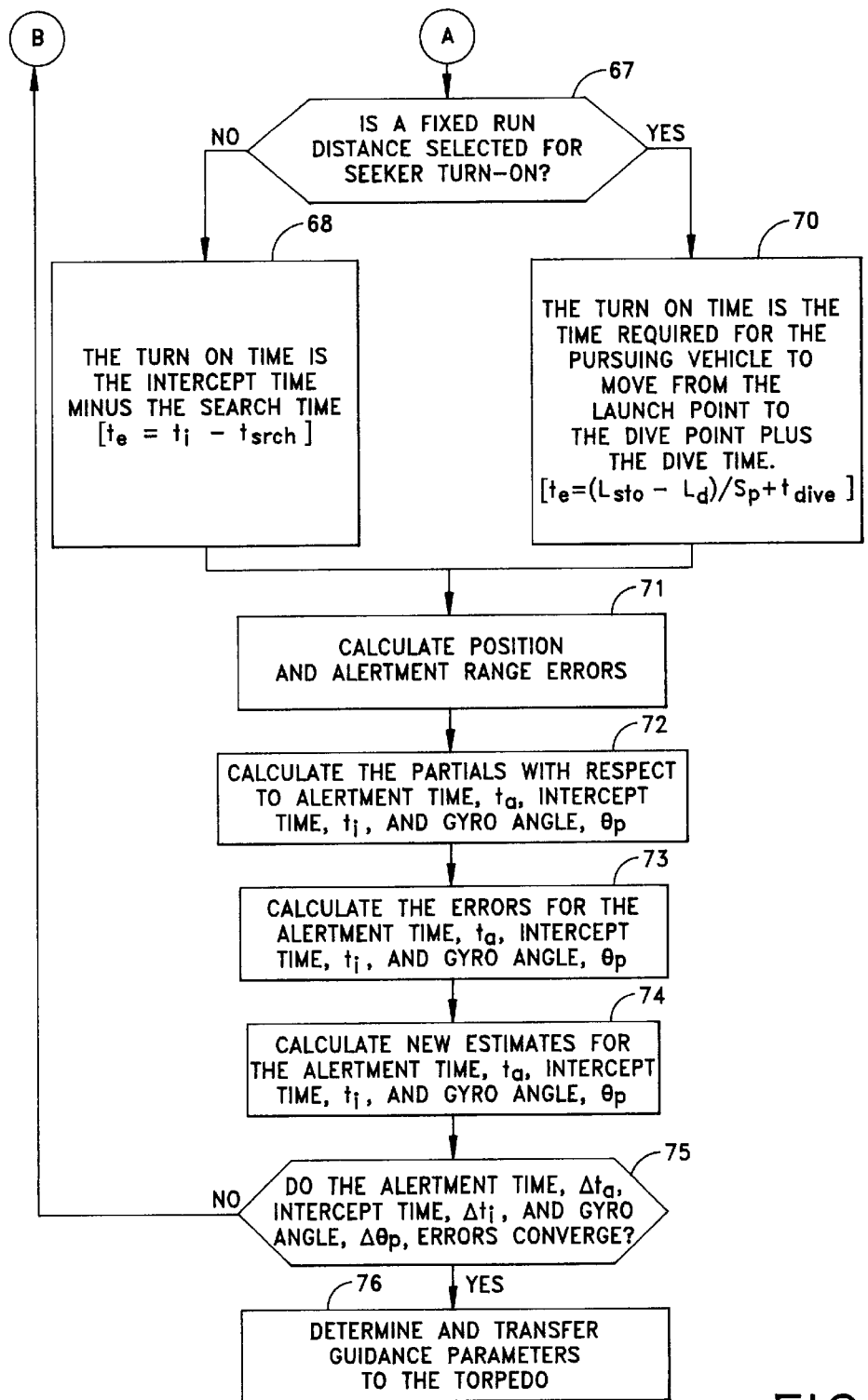

For the following conditions:
$t_i > t_{mc}$: $L_m = S_{ca}(t_i - t_a - t_{st} - r_c(\theta_c)/S_{ct})$; $\partial L_m/\partial t_a = -S_{ca} - (r_c/S_{ct})(\partial \theta_c/\partial t_a)$
$t_i \leq t_{mc}$: $L_m = 0$; $\partial L_m/\partial t_a = 0$; $\theta_c = \theta_{cdot}(t_i - t_m)$ and $\partial \theta_c/\partial t_a = -\theta_c$dot
If $L_{sto}$ is selected: $t_e = (L_{sto} - L_d)/S_p + L_d/S_{pd}$; $\partial t_e/\partial t_i = 0$
If $L_{sto}$ not selected: $t_e = t_i - L_o/S_{ps}$; $\partial t_e/\partial t_i = 1$ FIGS. 5A and 5B depict an operation of the evading target vehicle intercept unit 40 shown in FIG. 4 particularly adapted for applications in which both the launching and target vehicles are submarines and the pursuing vehicle is a torpedo. In this application, primary guidance parameters to be transferred to the torpedo prior to launch include an initial gyro angle, and the distance from the torpedo launch point 32 in FIG. 1 and the point 25 at which the acoustic seeker is enabled, commonly the run to enable. The launching vessel determines the range, bearing, course and speed of the target ship and normally can classify the target ship based on prior historical information to obtain estimates of other information such as the alertment range, $R_a$, the reaction time, or time delay, between alertment and the beginning of an evasive maneuver and the possible evasive maneuvers that might be taken for different bearings $B_p$ at the alertment time. The evasive maneuver information for each possible maneuver comprises a turn angle $C_d$ and radius $r_c$.

For a given tactical situation it also is possible to define particular parameters of the torpedo itself. Consequently in step 60 of FIG. 5A the evading target vehicle intercept unit 40 of FIG. 4 responds to the foregoing and other parameters to select appropriate position equations from the target vehicle position system 41 and the pursuing vehicle position system 42.

The evading target vehicle intercept unit 40 in FIG. 4 then uses the various equations, as previously indicated, to obtain the gyro angle and the run to enable by iteratively processing a series of equations until values of the gyro angle, alertment time and intercept time converge. Step 61 represents the selection of initial or estimated values of alertment time, $t_a$, intercept time, $t_i$, and initial gyro angle, $\theta_p$ that will be used as initial values for the iterative process.

Next, and in accordance with this invention, step 62 uses the various alertment equations to determine an estimate of the values for the alertment bearing $B_p$ and the turn angle $\theta_c$ according to equations 6 through 12. In step 63 the unit 40 in FIG. 4 calculates the time for completion of the target ship maneuver, $t_{mc}$, by summing the maneuver start time, $t_m$, and the time to complete the selected evasive maneuver obtained by dividing the maneuver included angle, $\theta_c$, by the predicted angular turn rate, $\theta_{cdot}$. The unit 40 uses step 64 to determine whether the intercept will occur after an evasive maneuver is complete. If it will, the unit 40 operates according to step 65 to calculate a value, $L_m$, that is the distance from the end of the target ship maneuver to the intercept point based upon the speed of the target vessel after the maneuver is complete, $S_{ca}$, the time interval between the termination of the maneuver, $t_{mc}$, and the time to the intercept point, $t_i$. Specifically in step 65, the process determines a value for $L_m$ as follows:

$$L_m = S_{ca}(t_i - t_{mc}) \quad (46)$$

The target ship turn angle, $\theta_c$, is not affected.

If, on the other hand, the intercept will occur during the evasive maneuver, the distance from the end of maneuver to the intercept point, $L_m$, must be zero and the actual target maneuver angle, $\theta_c$, will depend upon characteristic contact turn rate for the evasive maneuver, $\theta_{cdot}$, for the target over the interval that expires between the beginning of the maneuver, $t_m$, and the intercept point, $t_i$. Specifically, in step 66, as previously stated, for example:

$$L_m = 0 \quad (47)$$

$$\theta_c = \theta_{cdot}(t_i - t_m) \quad (48)$$

As previously stated, it is possible to determine the time at which an acoustic seeker turns on by one of two methods. If, in step 67 of FIG. 5B, the unit 40 determines that the enable run is not to be a fixed run distance from launch to seeker turn on, or that $L_{sto}$ is not selected, step 67 diverts to step 68 whereupon the unit 40 in FIG. 4 determines the turn on time, $t_e$, as a function of the intercept time minus a search time, $t_{srch}$, that is one of the input parameters provided in step 60. Specifically:

$$t_c = t_e - t_{srch} \quad (49)$$

This time is based upon the seeker offset distance of a pursuing vehicle with an acoustic seeker or corresponding parameter of another device. If it is desired to turn on the acoustic homing device a predetermined distance after launch, step 67 diverts to step 70 that defines the turn-on time as a function of the distance travelled from launch to dive point ($L_{sto}-L_d$), the distance travelled by the torpedo during any dive phase, $L_d$, the speed of the torpedo $S_p$, and the time required for any diving maneuvers, $t_{dive}$. Specifically:

$$t_e = \frac{L_{sto} - L_d}{S_p} + t_{dive} \qquad (50)$$

Next the unit 40 in FIG. 4 executes step 71 thereby to calculate equations (15), (16) and (19) as the general functions of problem unknowns to determine the position and alertment range errors. The unit 40 uses step 72 to determine the values of the partials using equations (29) through (45). Next the unit 40 uses equations (25), (26), (27) and (28) to solve for errors as delta values, $\Delta t_a$, $\Delta t_i$ and $\Delta\theta_p$ in step 73 and new values for the alertment time $t_a$, the intercept time $t_i$ and the gyro angle $\theta_p$ in step 74. In this particular embodiment there must be coincident convergence for each of the alertment time, intercept time and gyro angle values. If convergence has not been reached, step 75 uses the new estimates of the problem unknowns obtained in step 74 and transfers operation back to step 62 to begin another iteration. When convergence has been achieved, step 75 diverts to step 76 representing the determination and transfer of guidance parameters to the torpedo. These parameters include the gyro angle, $\theta_p$, seeker timer or time, $t_e$, alertment time, $t_a$, intercept time, $t_i$ and pursuer bearing.

Figure 6:
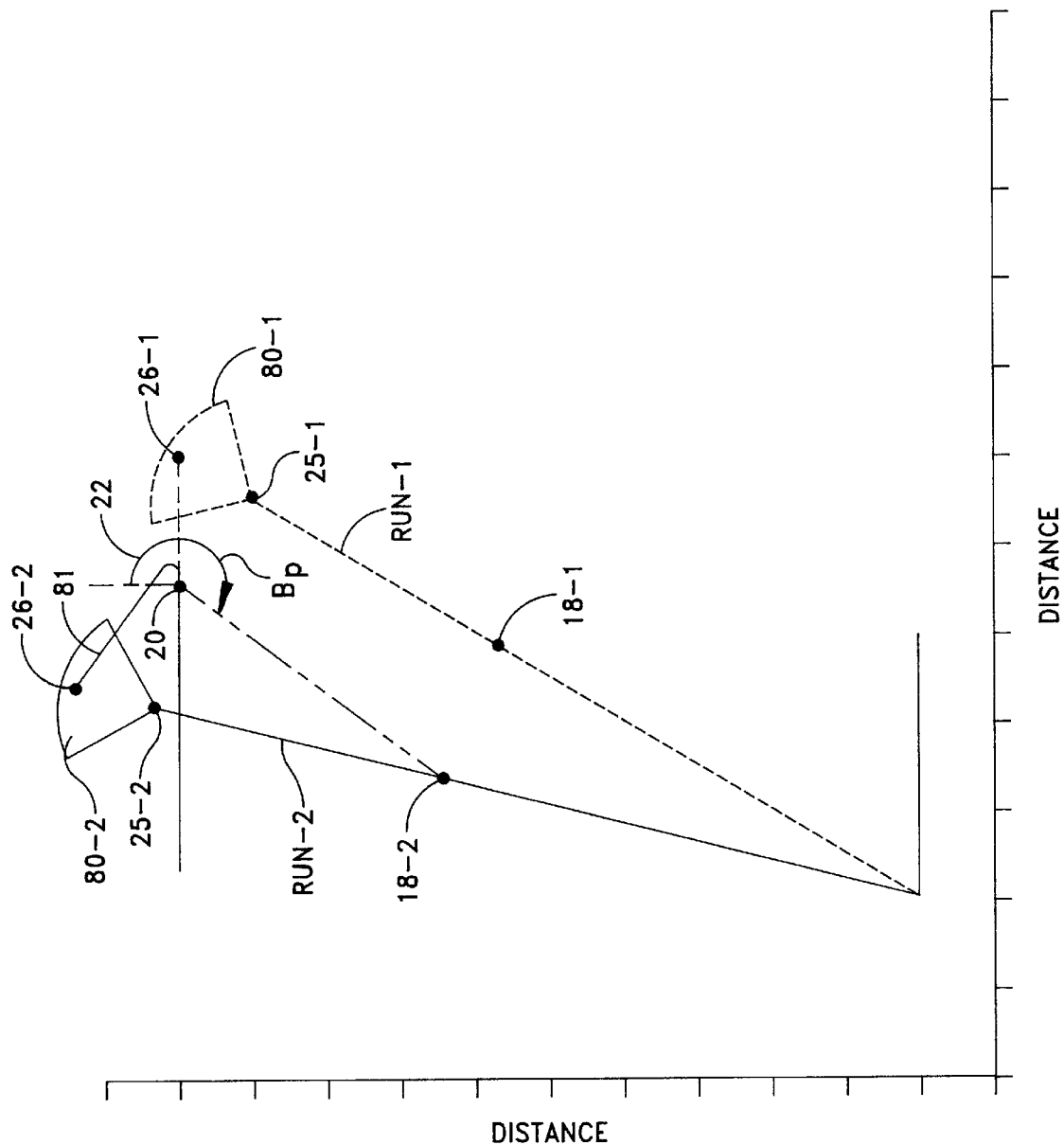
FIG. 6 depicts the trajectories of a pursuing vehicle generated when a target vehicle undertakes no evasive maneuver after alertment and when it does.

FIG. 6 demonstrates the process in quantitative terms. In a first run, i.e., RUN-1, it is assumed that the target vehicle will not make any evasive maneuver, but merely continue along an easterly course with no change in speed. In a second run, i.e., RUN-2, it is assumed that the target vehicle will turn to port to a course that bears 90° to the bearing $B_p$ and will increase its speed by 50%. For each of the first and second runs (RUN-1 and RUN-2) the other assumed parameters are:

$R_c$ = 10,000 yds
$A$ = 90°
$B$ = 90°
$R_a$ = 4,000 yds
$S_p/S_c$ = 2
$S_{sps}/S_p$ = 1.25
$L_a$ = 1,000 and
STO = −500
$r_c$ = 100 yds
$r_p$ = 50 yds
$S_{ct}$ = $S_c$
$S_{pt}$ = $S_p$
$S_{pd}$ = $S_p$
$D_r$ = 4.3 × 10$^{-3}$ deg/sec
$L_{sto}$ = 40

For RUN-1, it is further assumed that $C_d$=180−$B_p$ (which equates to no turn), $S_{ca}/S_c$=1 and $t_{st}$=0. These are the conditions of a non-evasive target vehicle. For RUN-2, it is assumed that the evasive maneuver will begin 30 seconds after alertment ($t_{st}$=30), that the target vehicle will turn to port to assume a course that is perpendicular to the bearing at alertment ($C_d$=−90°) and that the target vehicle will increase its speed by 50% ($S_{ca}/S_c$=1.5). The following table depicts the parameters generated in accordance with this invention.

| Parameter | RUN-1 | RUN-2 |
|---|---|---|
| Gyro angle (°) | −64.62 | −80.43 |
| $B_p$ (rad) | 1.662 | 2.126 |
| $t_a$ (sec) | 336.50 | 337.11 |
| $t_i$ (sec) | 505.61 | 513.68 |
| $t_e$ (sec) | 485.61 | 493.68 |

The errors along and across the track for the pursuing vehicle were less than 1 yard even after only a few iterations demonstrating rapid convergence to a solution even with the determination and use of the bearing $B_p$. Consequently, the control unit 40 provides the guidance parameters within a very short interval so that any delays do not affect the solution due to any change in relationships while the information is being determined.

FIG. 6 depicts the trajectory of RUN-1 as a dashed line and RUN-2 as a solid line when the resulting RUN-1 and RUN-2 gyro angles and enable times are included as guidance parameters for a given pursuing vehicle 10 such as a torpedo. For RUN-1 and RUN-2 it is assumed that alertment occurs when the pursuing vehicle and target vehicles are at points 18-1 and 18-2 respectively. In the case of a non-evading vehicle, the target vehicle continues its easterly course at a constant rate and the pursuing vehicle continues along its course until it reaches a turn-on time at point 25-1. At that point the acoustic seeker activates to produce the response area 80-1 that circumscribes the target vehicle at the intercept point 26-1.

For RUN-2 it is assumed that the target vehicle undertakes the previously described evasive maneuver by turning to port onto a track 81. In this case it will be apparent that the pursuing vehicle track differs from that of RUN-1 and that the pursuing vehicle is positioned at point 18-2 at alertment. In this case, however, at point 25-2 the acoustic seeker again activates to produce a response area 80-2 that circumscribes the target vehicle at the intercept point 26-2. By inspection it will also be apparent that the gyro angle computed for RUN-2 is larger in a negative direction that RUN-1 reflecting the requirement to intercept a target vehicle having a velocity component in an opposite direction from its initial course.

Allowing evasion tactics to be specified as a function of the bearing from the target vehicle to the pursuing vehicle at the time of alertment is important because that information is the very information upon which individuals at the target vehicle will make basic evasive maneuver decisions. It is, of course, still possible to operate the system with predetermined evasion tactics, but these tactics are now taken relative to a computed tactical situation rather than some arbitrary decision made in advance of the solution being generated. This invention, as previously disclosed, also facilitates the computation of solutions for gyro angles and enable-to-run times and other pursuing vehicle parameters that undergo multiple speed changes, reaction times, various depth changes, drift and different sensor activation criteria. The formulation of the models and the iterative solution technique presented allow all of these advantages to be achieved in a very rapid manner so that multiple solutions for multiple evasion tactics can be generated rapidly, even on the same time constraints as when the computation of the bearing from the target vehicle to the pursuing vehicle is not incorporated.

It has been found therefore that the process shown in FIGS. 5A and 5B as implemented in the evading target vehicle unit 40 in FIG. 4 can reach convergence and can produce valid guidance information for the torpedo in a short interval. More importantly, however, the system also accounts for the responses of a target vehicle to the presence of a pursuing vehicle, such as a torpedo, reaction times and various evasion strategies that might be utilized on a more realistic basis dependent upon bearing from the target vehicle to the pursuer vehicle. Thus the invention allows the generation of initial guidance parameters for transfer to a pursuing vehicle based upon predicted evasive tactics by a target vehicle based upon expected tactical or actual conditions. This facilitates the effectiveness of launching of a pursuing vehicle, such as a torpedo, without post-launch guidance. It will also be apparent that, while not disclosed with any specificity, the specific processes for performing the specific operations of this invention could be performed on general purpose computers, or on one or more special purpose computers that could be substituted for each of the systems shown in FIG. 4. Dedicated hardware and software might also be combined to perform the function of each system in FIG. 4.

This invention has been disclosed in terms of certain embodiments. It will be apparent that many modifications can be made to the disclosed organization of apparatus and method without departing from the invention. Therefore, it is the intent of the appended claims to cover all such variations and modifications as come within the true spirit and scope of this invention.

What is claimed is:

1. A control method for directing a pursuing vehicle from a launching vehicle to a target vehicle by supplying to guidance means in the pursuing vehicle operating parameters prior to launching wherein the launching vehicle includes identification means for establishing predetermined target vehicle operating characteristics including an expected alertment range at which the target vehicle is expected to detect the presence of the pursuing vehicle after its launch, said method comprising the steps of:

generating a representation of a characteristic trajectory from a generic model of pursuing vehicle trajectory;

generating, in response to data from the identification means, a representation of a characteristic trajectory from a generic model of target vehicle trajectory including the expected alertment range and a plurality of possible evasive actions for the target vehicle;

providing initial values for operating parameters;

iteratively propagating the characteristic trajectories to intercept in response to the initial values of the operating parameters according to a plurality of approximation relationships until the solutions converge, said iterative propagation including, during each iteration, determining an alertment bearing from the target vehicle to the pursuing vehicle at the alertment time;

selecting an evasive maneuver in response to and relative to the alertment bearing; and transferring the operating parameters that produce the convergence to the pursuing vehicle guidance means.

2. A control method as recited in claim 1 wherein said generating of operating parameters includes the step of determining the alertment time based upon the characteristic trajectories of the pursuing vehicle and the target vehicle.

3. A control method as recited in claim 2 wherein said step of generating representations of the target vehicle trajectory prior to the alertment time includes the steps of determining an initial path of the target vehicle from its position at the time of launching the pursuing vehicle to the position of the target vehicle at the alertment time.

4. A control method as recited in claim 3 wherein the step of generating the target vehicle trajectory after the alertment time includes the steps of defining a turning movement as a function of an angle relative to the alertment bearing, a turning radius and a turning rate.

5. A control method as recited in claim 4 wherein the step of generating the target vehicle trajectory after the alertment time additionally includes continuing the pre-alertment time trajectory for an interval corresponding to a target vehicle reaction time.

6. A control method as recited in claim 4 wherein the step of generating the target vehicle trajectory after the alertment time additionally includes identifying the velocity of the target vehicle.

7. A control method as recited in claim 1 wherein the launching, pursuing and target vehicles are constituted respectively by a submarine, a torpedo with a guidance gyro and instrumentation to be enabled after the launch, and a target vessel with alertment means for detecting the presence of the pursuing vehicle after its launch and wherein the transferred guidance parameters include an initial setting for gyro angle and a run-to-enable time that represents the interval from the launch time to the time at which the instrumentation is to be activated, said step of generating initial values of predetermined operating parameters including the step of providing initial values of alertment time, intercept time, gyro angle and the bearing from the target vessel to the torpedo.

8. A control system for directing a pursuing vehicle from a launching vehicle to a target vehicle by supplying, to guidance means in the pursuing vehicle, guidance parameters prior to launching wherein the launching vehicle includes identification means for establishing predetermined target vehicle operating characteristics including an expected alertment range at which the target vehicle is expected to detect the pursuing vehicle after its launching, said control system comprising:

means for generating a representation of a characteristic trajectory from a generic model of pursuing vehicle trajectory;

means for generating, in response to data from the identification means, a representation of a characteristic trajectory from a generic model of target vehicle trajectory including the expected alertment range and a plurality of evasive maneuvers;

means for providing initial values for the operating parameters;

means for iteratively propagating the characteristic trajectories in response to the initial operating parameters according to a plurality of approximation relationships until the solutions converge said propagating means including means for determining an alertment time, means for determining the alertment bearing from the target vehicle to the pursuing vehicle at the alertment time and means for determining course changes as a result of an evasive maneuver relative to the alertment bearing; and means for transferring the operating parameters that produce the convergence to the pursuing vehicle guidance means.

9. A control system as recited in claim 8 wherein iterative propagating means includes error means for comparing the differentials of the predetermined operating parameters generated during successive iterations for determining whether each of the operating parameters meet predetermined convergence criteria.

10. A control system as recited in claim 8 wherein the launching, pursuing and target vehicles are constituted respectively by a submarine, a torpedo with a guidance gyro and instrumentation to be enabled after the launch, and target submarine with an alertment range characteristic at which it is expected to detect the presence of the pursuing vehicle after its launch, wherein the transferred guidance parameters include an initial setting for gyro angle and a run-to-enable time that represents the interval from the launch time to the time at which the instrumentation is to be activated and wherein said initial values generating means provides initial values of alertment time, intercept time and gyro angle.

11. A control system as recited in claim 10 wherein the submarine includes means for determining a range vector to the target ship at the time of launch and said control system generating means determines various positions on a coordinate system aligned with the range vector.

12. A control system as recited in claim 10 wherein said iterative propagating means includes error means for comparing successive solutions for the time of intercept, time of alertment and torpedo gyro angle.

13. A control system as recited in claim 10 wherein said iterative propagating means includes error means for comparing successive values at the end of an iteration and enabling the transfer of guidance values when each of the comparisons is within a predetermine range.

14. A control system as recited in claim 10 wherein said iterative propagating means includes means for determining an alertment bearing from the target submarine to the torpedo and the evasive action definition includes a turn angle relative to the alertment bearing.

15. A control system as recited in claim 10 wherein said iterative propagating means includes means for determining an alertment bearing from the target submarine to the torpedo at the alertment time and said representation of target vehicle trajectory includes, for the target submarine, a reaction time, turn angle and speed, said propagating means including means for incorporating the evasive action defined thereby with any turn being relative to the alertment bearing.

* * * * *